United States Patent [19]

Takahashi et al.

[11] 4,087,480

[45] May 2, 1978

[54] OXYALKYLATED NOVOLAC MODIFIERS FOR POLYVINYL HALIDE COMPOSITIONS

[75] Inventors: Akio Takahashi, Amherst; Geoffrey H. Smith, North Tonawanda; Brian M. Rushton, Williamsville; Myron C. Annis, North Tonawanda, all of N.Y.

[73] Assignee: Hooker Chemicals & Plastics Corporation, Niagara Falls, N.Y.

[21] Appl. No.: 592,685

[22] Filed: Jul. 2, 1975

Related U.S. Application Data

[63] Continuation-in-part of Ser. No. 485,044, Jul. 1, 1974, abandoned.

[51] Int. Cl.² ............................................. C08L 27/06
[52] U.S. Cl. ..................................... 260/847; 260/846; 260/848
[58] Field of Search ............... 260/844, 847, 845, 846, 260/848

[56] References Cited

U.S. PATENT DOCUMENTS

| 2,606,935 | 8/1962 | Martin | 260/847 |
|---|---|---|---|
| 3,294,866 | 12/1966 | Soldatos | 260/845 |
| 3,697,459 | 10/1972 | Dannels et al. | 260/847 |
| 3,853,690 | 12/1974 | McGarry et al. | 260/847 |

*Primary Examiner*—J. Ziegler
*Attorney, Agent, or Firm*—Peter F. Casella; James F. Mudd; David A. Stein

[57] ABSTRACT

There is provided a polymer composition based upon an oxyalkylated novolac intermixed with a vinyl halide polymer. The compositions of the invention provide improved processing characteristics with reduced melt viscosity and improved physical and mechanical properties. Mixtures of (1) polyvinyl halide, oxyalkylated novolac and impact modifier, such as an acrylic polymer or (2) mixtures of oxyalkylated novolac and polyvinyl halide modified to provide improved impact strength by graft polymerization show improved compatibility of the rubbery polymer phase resulting in optimum impact strength for the composition.

13 Claims, No Drawings

OXYALKYLATED NOVOLAC MODIFIERS FOR POLYVINYL HALIDE COMPOSITIONS

REFERENCE TO PRIOR APPLICATION

This application is a continuation-in-part of copending U.S. application Ser. No. 485,044 filed July 1, 1974 now abandoned.

BACKGROUND OF THE INVENTION

1. Field of the Invention

This invention relates to the modification of rigid polyvinyl halide to render such polymers more suitable for use in the preparation of moldings and to improve the physical properties of the polymers, for instance, to improve the impact strength.

2. Description of the Prior Art

It is known from U.S. pat. No. 2,384,947 to blend polymeric vinylidene chloride products with phenol formaldehyde resins including pure phenolic resins and reaction products of phenol with an aldehyde modified by the addition of other substances. Such mixtures provide a polymeric vinylidene chloride product which can be molded or extruded at lower temperatures and pressures than can be the polymeric vinyldene chloride alone. Articles prepared from such compositions retain a high tensile strength and can be used to produce molded articles which are translucent to opaque and have a durable glossy finish.

It is also known to prepare compositions comprising a vinyl resin, plasticizer therefor, and a thermoset phenol aldehyde resin of the novolac type which has been advanced to the insoluble infusible stage, while in an intimate and homogeneous mixture with the vinyl resin and plasticizer (U.S. Pat. No. 2,659,708). Such mixtures are prepared using the phenolic resin prior to its advancement to any substantial extent toward the insoluble, infusible stage and then after an intimate homogeneous mixture has been formed advancing the phenolic resin in the presence of a hardening agent while mechanically working the mixture while hot.

Oxyalkylated novolacs can be prepared from phenol aldehyde condensates by reacting these with mono-oxirane ring compounds, alkylene halohydrins or an alkylene carbonate as disclosed in U.S. Pat. No. 3,538,040.

Polyvinyl chloride usually must be modified, compounded, or copolymerized with other materials to provide processable and useful compositions. For example, when processing polyvinyl chloride on rolling mills, such materials as chlorinated polyethylene and acrylic polymers, such as polymers of methyl methacrylate and ethylacrylate, are added for flexibility, in addition to such materials as plasticizers illustrated by dioctyl phthalate, polypropylene adipate, etc.

The compounding of the polyvinyl chloride compositions is necessary because of the limitations in processability of the polyvinyl chloride. The usual fabrication temperatures for rigid polyvinyl chloride compositions can lead to thermal degradation of the product during extended fabrication periods. At the temperature of extrusion, injection, thermoforming, blow molding and the like, polyvinyl chloride compositions tend to degrade due to the heat instability of the polyvinyl chloride. It is obviously most desirable that polyvinyl chloride should be processable at lower temperature and with shorter cycle times, thereby minimizing changes resulting from thermal degradation. While common plasticizers reduce the melt viscosity of polyvinyl chloride, these materials also flexibilize the composition at service temperatures and thereby adversely affect the physical properties of the composition intended to be rigid at service temperature.

It has now been discovered that the inclusion of oxyalkylated novolacs in polyvinyl chloride provide homogeneous compositions which eliminate or greatly improve upon many of the deficiencies of rigid polyvinyl chloride, without detracting from the desirable physical properties. The oxyalkylated novolacs act to improve the processing characteristics by reducing the melt viscosity of the mixture.

SUMMARY OF THE INVENTION

This invention relates to a method of improving the properties of rigid polyvinyl halide so as to render the polymer more suitable for use in the preparation of moldings. In addition, the invention relates to a method of rendering polyvinyl halide more compatible with impact modifiers so as to obtain optimum impact strength where impact modifiers are used in combination therewith. Compositions of the invention modified by the inclusion of an oxyalkylated novolac into a vinyl halide polymer such as polyvinyl chloride provide rigid compounds suitable for the preparation of moldings which have, as compared to unmodified polyvinyl halide, reduced fusion time and processing temperature, increased uniformity, gloss, and smoothness in the polymer subsequent to processing, reduced surface imperfections and "plate-out" during processing, and increased hot elongation and hot tear strength.

The vinyl halide polymer contemplated for use in the invention is a vinyl halide homopolymer or a vinyl halide bi-, ter-, tetra- or higher co-polymer of vinyl halide with up to about 50% by weight of an other ethylenically unsaturated monomer copolymerizable with said vinyl halide. The polyvinyl halide ingredient of the present compositions can also be a graft polymer of vinyl halide on a trunk polymer which is a polyolefin elastomer or rubber such as an ethylene-propylene rubber or an ethylenepropylene diene rubber. The vinyl halide monomer used in preparing the above-defined homopolymer, copolymer and graft polymer is preferably vinyl chloride.

Where it is desired to provide resin compositions according to the invention of especially good impact strength, the polyvinyl halide component employed in the present polyvinyl halide-oxyalkylated novolac resin mixture is a polyvinyl halide-polyolefin rubber graft polymer. Alternatively polyvinyl halide-oxyalkylated novolac resin compositions of the invention wherein the polyvinyl halide component is a polyvinyl halide homo- or copolymer can be physically admixed with a conventional impact modifying agent such as a lower alkyl methacrylate-butadiene-styrene polymer, to provide compositions of especially good impact strength. In the latter embodiment the presence of the oxyalkylated novolac resin according to the invention provides optimum compatibility between the polyvinyl halide and the impact modifier. Where such blends of oxyalkylated phenolic resin and polyvinyl halide are used in combination with impact modifiers, it has been found that optimum impact strength can be obtained in these compositions, in addition to there being provided an improvement in processability of the impact strength modified polyvinyl halide.

As compared to the use of a phenolic novolac which is not oxyalkylated in mixtures with polyvinyl halide, the oxyalkylated novolac when mixed with polyvinyl halide does not discolor the blend. On the other hand the non-oxyalkylated novolac-polyvinyl halide mixtures are yellow in color.

The inclusion of the oxyalkylated novolac polymers in polyvinyl halide compositions yields many advantages including greatly increased flow at melt temperatures, that is, processing temperatures, without adversely affecting the physical characteristics of the compositions at normal service temperatures.

DESCRIPTION OF THE PREFERRED EMBODIMENTS

The preferred compositions of the invention incorporate an oxyalkylated novolac into a polyvinyl halide polymer to provide a homogeneous composition having a reduced melt viscosity, thereby rendering the composition more easily processable at the usual fabrication temperatures for rigid polyvinyl halide compositions. The oxyalkylated novolac compositions utilized in the polyvinyl halide compositions of the invention are oxyalkylated novolacs having the formula:

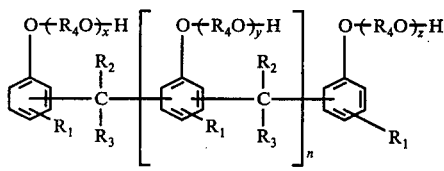

wherein
$n$ has an average value of about 0.2 to 6, preferably about 0.5 to 3;
$x$, $y$ and $z$ are integers from 1 to 25, preferably about 1 to 10;
$R_1$ is independently selected from the group consisting of hydrogen, fluorine, chlorine, bromine, and a hydrocarbon radical;
$R_2$ and $R_3$ are independently selected from the group consisting of hydrogen, a hydrocarbon radical, and a halogen substituted hydrocarbon radical; and
$R_4$ is a hydrocarbon radical.

The oxyalkylated novolac can be prepared by reacting a fusible organic-solvent soluble condensation product of a phenol and an aldehyde or a ketone containing condensate units having reactive phenolic hydroxyl groups and a substance reactive with the phenolic hydroxyl groups selected from the group consisting of mono-oxirane ring compounds, alkylene halohydrins, alkylene carbonates, and mixtures thereof. A modified phenol can be used to prepare the oxyalkylated novolacs wherein the phenolic hydroxyl group is first reacted with one of the above substances reacted with phenolic hydroxyl and subsequently the modified phenol is reacted with an aldehyde or ketone. Examples of suitable fusible organic solvent-soluble condensation products of a phenol, an aldehyde or ketone suitable for use in the preparation of the oxyalkylated novolacs of the invention are disclosed in U.S. Pat. No. 3,538,040, hereby incorporated by reference.

The oxyalkylated novolac condensation products preferably contain no free reactive phenolic groups, i.e., less than about 5%, but preferably less than about 0.5% of the phenolic hydroxyl present originally in the phenolaldehyde or phenol-ketone condensate.

The preferred method of hydroxyalkylation to produce the oxyalkylated novolacs useful in the invention is by reaction of said condensation products with compounds containing a mono-oxirane ring. Monomeric epoxides, such as ethylene oxide, propylene oxide, butylene oxide, cyclohexane oxide, or mixtures thereof are preferred. Catalysts for the reaction of the oxirane ring compounds and phenolic hydroxyl groups are alkali or alkaline earth hydroxides, primary amines, secondary amines, tertiary amines or basic alkali salts such as sodium, potassium, and lithium hydroxides; amines such as methyl, dimethyl, diethyl, tripropyl, and the like; salts of strong bases and weak acids, such as sodium acetate or sodium benzoate. The hydroxyalkylation reactions can be carried out at 50°–250° C, but the hydroxyalkylation of phenols is preferably performed at 50°–150° C. The hydroxyalkylation of the phenolic condensates is preferably performed at 150° to 250° C.

The phenolic hydroxyl of the phenolic condensates can also be hydroxyalkylated by reacting it with alkylene halohydrins using equivalent amounts of an alkali metal hydroxide to bring about the reaction. Another method for hydroxyalkylating a phenolic novolac is by reaction with an alkylene carbonate, such as ethylene carbonate or propylene carbonate, using a catalyst such as sodium or potassium carbonate.

The oxyalkylated novolac resins of the invention should have melting points of between about 50° to about 180° C., preferably about 70° to about 150° C, and a molecular weight on a weight average basis of about 500 to about 20,000, preferably 1,000 to about 5,000. Selection of oxyalkylated novolacs within these ranges of physical properties provides optimum compatibility of the oxyalkylated novolac with the polyvinyl chloride or polyvinyl chloride copolymer without sacrifice of desirable properties in the base polyvinyl chloride polymer. Besides replacement of the hydrogen atom of the phenolic OH group by oxyalkylation, the hydrogen atom can be replaced by other long chain alkyl groups to increase the melting point of the resin and/or the compatibility of the resin with the polyvinyl halide polymer or with impact modifiers.

The vinyl halide polymer can be made by any of the known distinctive polymerization processes used for preparation of these polymers e.g., emulsion, suspension, solution or bulk polymerization. Conveniently vinyl halide polymers prepared by the bulk polymerization mode are employed.

The polyvinyl halide resin contemplated in the use of this invention is a rigid resin, i.e., a resin containing less than about 10 percent plasticizer or none at all. Typically, the resin is a readily available commercial resin having a heat deflection temperature of about 64°–69° C., a second order transition temperature of about 73°–80° C and is processed at a temperature on the order of about 360° F. or even higher. While vinyl chloride is the preferred vinyl halide monomer reactant used in preparing the vinyl halide polymers of the invention, other suitable vinyl halide monomers useful in the invention are the alpha-halo-substituted ethylenically unsaturated compounds which like vinyl chloride are capable of entering into an addition polymerization reaction, for example, vinyl fluoride, vinyl bromide, vinyl iodide, vinylidene fluoride, vinylidene chloride, vinylidene bromide, vinylidene iodide and the like. Vinyl halide polymers derived from polymerization of two, three or more different vinyl halide monomers can also be used it is to be understood that the polyvinyl halide resin as contemplated for use in this invention can be a modified resin, e.g., a copolymer resin of polyvinyl chloride with a minor amount i.e. less than 50 weight percent of the total monomer mixture of polyvinyl acetate, or a copolymer resin prepared by copolymerizing vinyl halide monomer with, for example, up to about 30 weight percent of a modifying substance such as with methyl acrylate monomer or with ethyl acrylate monomer. Thus while the polyvinyl halide component of the invention is preferably comprised totally of vinyl chloride homopolymer, or other vinyl halide homopolymer, the present invention is also intended to include copolymers thereof as previously described. Suitable ethylenically unsaturated monomer materials can be used to form base bipolymers, terpolymers, tetrapolymers and higher copolymers, interpolymers, and the like, by the reaction with vinyl chloride of the following monoolefinic hydrocarbons, i.e., monomers containing only carbon and hydrogen, including such materials as ethylene, propylene, butene-1, 3-methyl-butene-1, 4-methylpentene-1, pentene-1, 3,3-dimethylbutene-1, 4,4-dimethylbutene-1, octene-1, decene-1, styrene and its nuclear alphaalkyl or aryl substituted derivatives, e.g., o-, m- or p-methyl, ethyl, propyl or butyl styrene; alpha-methyl, ethyl, propyl or butyl styrene; phenyl styrene, and halogenated styrenes such as alphachlorostyrene; monoolefinically unsaturated esters including vinyl esters, e.g., vinyl acetate, vinyl propionate, vinyl butyrate, vinyl stearate, vinyl laurate, vinyl benzoate, vinyl caprate, vinyl hexanoate, vinyl-p-chlorobenzoates, alkyl methacrylates, e.g., methyl, ethyl, propyl and butyl methacrylate; octyl methacrylate, lauryl methacrylate, stearyl methacrylate, alkyl crotonates, e.g., octyl; alkyl acrylates, e.g., methyl, ethyl, propyl, butyl, 2-ethyl hexyl, stearyl, n-hexyl, n-octyl, hydroxyether and tertiary butylamino acrylates, 2-ethoxy ethyl acrylate, 2-methoxy ethyl acrylate, isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohols and beta-propyl allyl alcohol; halo-alkyl acrylates, e.g., methyl alpha-chloroacrylate, and ethyl alpha-chloroacrylate, methyl alpha-bromoacrylate, ethyl alpha-bromoacrylate, methyl alpha-fluoroacrylate, ethyl alpha-fluoroacrylate, methyl alpha-iodoacrylate and ethyl alpha-iodoacrylate; alkyl alpha-cyanoacrylates, e.g., methyl alphacyanoacrylate and ethyl alpha-cyanoacrylate; itaconates, e.g., monomethyl itaconate, monoethyl itaconate, diethyl itaconate, alcohol (C-3 to C-8) itaconates; maleates, e.g., monomethyl maleate, monoethyl maleate, dimethyl maleate, diethyl maleate, alcohol (C-3 to C-8) maleates; and fumarates, e.g., monomethyl fumarate, mono-ethyl fumarate, dimethyl fumarate, diethyl fumarate, alcohol (C-3 to C-8) fumarates, and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile, and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether, and the like; and vinyl sulfides, e.g., vinyl beta-chloroethyl sulfide, vinyl beta-ethoxyethyl sulfide and the like can also be included. As can diolefinically unsaturated hydrocarbons contaning two olefinic groups in conjugated relation and the halogen derivatives thereof, e.g. butadiene-1,3; 2-methylbutadiene-1,3; 2,3-dimethylbutadiene-1,3; 2-chlorobutadiene-1,3; 2,3-dichlorobutadiene-1,3; and 2-bromobutadiene-1,3 and the like.

The vinyl halide polymer component of the present oxyalkylated novolacpolyvinyl halide compositions can also be a graft polymer of a vinyl halide and a polyolefin rubber i.e. elastomer, which is characterized by being soluble, partially soluble, or dispersible at ambient or room temperature and pressure in vinyl halide monomer. The latter known graft polymers are obtained by polymerizing a mixture of vinyl halide monomer with one or more ethylenically unsaturated comonomers of the type described above or more conveniently a vinyl halide monomer in the presence of the polyolefin elastomer. The polyolefin elastomer or rubber is a homopolymer, bipolymer, terpolymer, tetrapolymer or higher copolymer of olefinic monomers thereof. The olefin polymers can also contain a diene as a monomer unit.

Olefin homopolymer can be obtained by polymerization of a suitable monomer such as propene, i.e. propylene, butene-1, isobutene, pentene hexene, heptene, octene, 2-methylpropene-1, 3-methylbutene-1, 4-methylpentene-1, 4-methylhexene-1, or 5-methylhexene-1.

Suitable comonomers for use in preparing polyolefins are those utilized to prepare the olefin homopolymers as listed above such as propene or butene-1 with ethene i.e. ethylene or isobutylene with isoprene ethene with vinylacetate, ethene with ethyl acrylate, and the like. Suitable termonomers are those utilized to prepare homopolymers and copolymers as disclosed above such as propene, ethene and the like as well as dienes. Especially suitable diene-derived ter- and higher co-polymers can be prepared from olefin monomer mixtures containing up to 15 percent preferably up to about 6 percent by weight of a diene such as dicyclopentadiene, butadiene, cyclooctadiene and other dienes with linear or cyclic chains. The polyolefin used may also be a halogenated polyolefin, e.g. a chlorinated, brominated or fluorinated polyolefin.

The polyolefins used are characterized by being soluble, partially soluble or dispersible at normal room temperature and pressure in vinyl chloride monomer, and in having, typically, monomeric units of 2 to 8 carbon atoms. The weight average molecular weight of the olefin polymers, copolymers, terpolymers, and tetrapolymers can vary from about 50,000 to about 1,000,000 and higher. Preferred as polyolefin rubbers for use in preparing vinyl halide graft polymers for use in the invention are ethylene propylene polyolefin elastomers and ethylenepropylene-diene polyolefin elastomers.

The vinyl halide-graft polymers of the polyolefin elastomers are prepared by polymerizing the vinyl halide in the presence of about 0.05 to about 20% preferably about 1 to about 20%, based on the weight of vinyl halide monomer of the above described polyolefin rubber. Preparation of such vinyl halide-polyolefin graft polymer according to emulsion and suspension polymerization techniques is described in G. Natta et al.

U.S. Pat. No. 3,812,204, the pertinent subject matter of which is incorporated herein by reference. Conveniently the preparation of the vinyl halide-polyolefin graft polymers useful as the polyvinyl halide component of polyvinyl halide oxyalkylated novolac mixtures of the invention is effected by a bulk polymerization technique as described by A. Takahashi, copending U.S. application Ser. No. 427,895 filed Dec. 26, 1973; the pertinent subject matter of which is also incorporated herein by reference.

The product of the polymerization of vinyl halide in the presence of the polyolefin rubber contains both vinyl halide homopolymer and the vinyl halidepolyolefin rubber graft polymer. When such mixture is used as the polyvinyl halide component of the polyvinyl halide-oxyalkylated novolac mixture of the invention, the oxyalkylated novolac enhances the compatibility between the polyvinyl halide homopolymer and the polyvinyl halide-polyolefin graft polymer to obtain an optimum impact strength together with an improvement in processability of the mixture.

The impact modifying agents which may be physically mixed with the present polyvinyl halide-oxyalkylated novolac compositions to improve the impact strength of the latter when a polyvinyl halide-polyolefin graft polymer is not employed as the polyvinyl halide component are well-known proprietary polymer compositions designated as acrylic polymer impact modifiers. Typically these conventional impact strength improving agents are acrylonitrile-butadiene-styrene polymers, lower alkyl methacrylatebutadiene-styrene polymers, or lower alkyl methacrylate-acrylonitrile-butadienestyrene polymers wherein the lower alkyl signifies an alkyl substituent of one to eight carbon atoms such as ethyl n-propyl, isopropyl, n-hexyl, n-octyl and preferably, methyl. Typical examples of commercially available acrylic impact strength modifiers include Acryloid KM 228, KM-229, KM-607 and KM-611, which are proprietary acrylic impact modifiers manufactured by the Rohm and Hass Co. and kane Ace B-12 which is a proprietary methyl methacrylatebutadiene-styrene polymer impact strength modifying agent manufactured by kanegafuchi Chem. Ltd. Acrylic impact strength - increasing agents are more particularly described in P. F. Bruins, Ed., "Polyblends and Composites" Interscience Publishers, 1970 pages 166–176 and in S. Nakano et al., U.S. Pat. No. 3,725,507, col. 5, lines 37–49 the pertinent subject matter of which references is incorporated herein by reference. In accordance with the present invention the amount of acrylic impact modifier which is added to the present compositions is about 5 to 15% based on the weight of polyvinyl halide-oxyalkylated novolac composition.

If desired the polyvinyl halide-oxyalkylated novolac composition can also contain an acrylic polymer processing aid which is added to the composition prior to molding, extrusion, calendering or other processing step to which the present polyvinyl halide-oxyalkylated novolac mixture may be subjected. Such processing aid agents are proprietary acrylic co-polymers, typified by Acryloid K-120N, 55D-42 and AP-341C, acrylic processing agents manufactured by Rohm and Hass Company. These conventional agents serve to enhance uniformity, hot elongation and hot tear strength and eliminate plate-out in the processing of polyvinyl halide compositions as more particularly described in P. F. Bruins, Ed. op. cit. p. 166 and in C. F. Ryan, SPE Journal 24 89(1968), the pertinent subject matter of which references is incorporated herein by reference. Generally the amount of such processing aid added to the present compositions is quite small being usually about 1 to 10%, preferably about 2 to 5% based on the weight of the composition.

The compositions of the present invention contain about 1 to about 30 parts oxyalkylated novolac per 100 parts of vinyl halide polymer, preferably about 3 to about 15 parts per 100 parts of vinyl halide polymer. The impact strength modifiers when used in combination with the mixtures of the invention can be present in the amount of about 1 to about 10 parts based upon 100 parts by weight of polyvinyl halide. The oxyalkylated novolac is permanently incorporated in these mixtures and such mixtures resist extraction, migration and aging.

Best results are obtained by preparation of the mixtures of the invention by blending thoroughly and uniformly. The compositions can be intimately mixed by heating the components to a temperature sufficient to soften them while providing agitation until a uniform blend is formed. The temperature required to soften or melt the components depends upon the particular oxyalkylated novolac and vinyl halide polymer selected, but generally will be in the range of about 150° to 215° C. It is generally preferred to use the lowest temperature which will permit adequate mixing. Suitable mixing devices include heated two roll mills, internal mixers, such as the Banbury mixer and twin barrel extruders or single screw extruders fitted with mixing devices attached to the screw.

A convenient procedure for preparing the compositions of the invention consists of dry blending a fine powder of the vinyl halide polymer with the oxyalkylated novolac in granular form, in the barrel of an extruder or injection molding machine at the time the oxyalkylated novolac is being used in combination with the vinyl halide polymer to prepare extruded or molded goods. The vinyl halide polymer may also be conveniently added to the molten oxyalkylated novolac immediately following completion of the polymerization step used to prepare the oxyalkylated novolac.

The equilibrium torque measured in meter-grams (m-g) which corresponds to the melt viscosity was measured at 400° Fahrenheit using a Brabender Plasticorder set for 63 rpm. A weighed amount of sample containing a lead stabilizer sold under the trademark "Tribase" is charged into the Brabender chamber. After reaching the fusion point, the equilibrium torque is measured on the sample.

Izod. impact (notched) strength was measured following the procedure of ASTM D-256 using a ⅛ inch sheet compression molded at 360±5° Fahrenheit. Prior to compression molding, the sample was milled on a two-roll mill having rolls at a temperature of 400±5° Fahrenheit.

In finely divided form, the blends of this invention offer advantages for procedures employing powdered thermoplastics. In addition, they can be used in crumb form. The flow characteristics of these blends facilitate fusion bonding procedures such as rotational molding (either one or two axis methods), slush molding, and centrifugal molding, as well as powder coating techniques such as fluidized bed, electrostatic spray, flame spray, flock coating, powder flow coating, cloud chamber and heat fused coating (for flexible substrates). Plastisols made from mixed polyvinyl halideoxyalkylated novolac powder dispersions are useful for surface coatings, coated fabrics and foams.

The following examples are provided to demonstrate how the oxyalkylated novolac-vinyl halide polymer mixtures of the invention can be used. These examples are not intended to limit the scope of the invention but merely to illustrate the invention. It is to be expected that one skilled in the art will be able to appreciate the possibility of many more embodiments of the invention than are illustrated in the examples. All parts, proportions and percentages disclosed in this specification and claims herein are by weight and temperatures are in degrees centigrade unless unless otherwise indicated.

EXAMPLE 1

An oxyalkylated novolac useful in the invention is prepared by first preparing a modified phenol aldehyde condensation product by introducing 14,000 parts of phenol, 15 parts maleic anhydride and 18 ½ parts of a wetting agent into a jacketed reactor and heating to 115° C. The wetting agent used is an alkylaryl sulfonate type. 4300 parts of a 37% aqueous formaldehyde solution is then added to the reactor at a rate such that the heat of reaction provides a vigorous reflux. After completion of the formaldehyde addition, refluxing is continued at 102°–105° C for 1 hour. The reactor contents are then dehydrated at 180° C and dephenolated at 200° C using 50 millimeters of vacuum. To the phenol aldehyde condensation product, there are added 3.0 parts sodium hydroxide and, then, ethylene oxide totalling 9,335 parts, is added over a period of 2 hours, while the batch is at a temperature in the range of 205° C. When addition of the ethylene oxide is complete, the temperature is permitted to increase to a range of 200° to 215° C and mixing is continued for one-half hour. The resulting oxyalkylated novolac has a melting point of 110° C and a molecular weight of about 1,000 on a weight average basis.

EXAMPLE 2 (COMPARATIVE EXAMPLE)

There is mixed on a two-roll mill having a roll temperature of 410°+5° Fahrenheit, 100 parts of a commercial white powdered polyvinyl chloride resin having a second order transition temperature of about 76° Centigrade, a specific viscosity of 1.10, 0.5% maximum moisture, a bulk density of 35 pounds per cubic foot, and a screen analysis of 100% through a 40 mesh U.S. standard sieve, 2.1 grams of a heat stabilizer sold under the trademark of "Thermolite T-31" by M & T Chemical Company, 1.1 grams of a waxy lubricant sold under the trademark of "Advawax 140" by Cincinnati-Milacron Co. The mixture fuses after mixing for a period of time greater than 5 minutes. The roll bank uniformity is judged poor and hot tear strength is poor.

EXAMPLE 3 (COMPARATIVE EXAMPLE)

Example 2 is repeated using the same procedure and proportions of ingredients as in Example 2, except that 3.7 grams of an acrylic polymer sold under the trademark of "Acryloid K-120 ND" by Rohm & Hass Co., are mixed into the polyvinyl chloride resin of Example 2. It is observed that the mixture fuses after mixing for a period of 45 seconds and the roll bank uniformity appears fair. Hot tear strength is judged good. Compatibility is judged good as indicated by the smooth and glossy surface of the roll bank.

EXAMPLE 4

Example 2 is repeated using the same proportions as in Example 2, except that 3.7 grams of the oxyalkylated novolac prepared in Example 1 are mixed with the polyvinyl chloride resin. Fusion occurs after 40 seconds. The roll bank uniformity is judged fair to poor. The composition shows hot tear strength and good compatibility as indicated by smoothness of the surface.

EXAMPLE 5

Example 2 is repeated using the same procedure and proportions as in Example 2, except that 3.7 grams of "Acryloid K-120 ND" and 3.7 grams of the oxyalkylated novolac of Example 1 are mixed with the polyvinyl chloride. Fusion occurs after 25 seconds. The roll bank uniformity is judged good. The composition shows high gloss and smoothness which indicates good compatibility.

EXAMPLE 6 (COMPARATIVE EXAMPLE)

A Brabender Plasticorder is set to operate at 400° Fahrenheit and 63 revolutions per minute. 100 grams of the polyvinyl chloride homopolymer of Example 2 are added to the Brabender mixing chamber, together with 2.25 grams of a lead stabilizer sold under the trademark of "Tribase" by National Lead Industries. Equilibrium torque which corresponds to melt viscosity is 950 meter-grams. The time for fusion is greater than 2 minutes.

EXAMPLE 7 (COMPARATIVE EXAMPLE)

Example 6 is repeated using the same procedure and ingredients as in Example 6 except that 5 grams of "Acryloid K-120 ND" are added to the polyvinyl chloride homopolymer. Equilibrium torque is 1200 meter-grams and the time for fusion to occur is 40 seconds.

EXAMPLE 8

Example 6 is repeated using the same procedure and ingredients as in Example 6, except that 5 grams of the oxyalkylated novolac of Example 1 are added to the polyvinyl chloride. The equilibrium torque is 1100 meter-grams and the fusion time is 35 seconds.

EXAMPLE 9

An ethylene-propylene rubber graft-vinyl chloride polymer is prepared in bulk by adding 20 grams of an ethylene-propylene rubber containing 55% ethylene of 76,700 weight average molecular weight and 270 grams of vinyl chloride monomer to a one-liter glass autoclave equipped with a magnetic driven agitator having a spiral type stirring blade and a thermocouple. About 20 g. vinyl chloride are vented to remove air from the reactor. The pressure of the reactor is adjusted to 2.5 atmospheres pressure by introducing nitrogen gas. The reactor is heated to 60° Centigrade while stirring and the rubber is dissolved within half an hour. The rubber solution is cooled down to 25° Centigrade and then an additional 250 g. vinyl chloride are introduced in the reactor, along with 0.03 ml. of a 29 percent solution of acetyl cyclohexane sulfonyl peroxide in dimethyl phthalate and 0.3 g. of 75% t-butyl-peroxypivalate solution in mineral spirits. Twenty grams of vinyl chloride are vented to remove air and the pressure is adjusted to 2.5 atmospheres pressure by introducing nitrogen. The reaction mixture is heated to 65° Centigrade while stirring. The reaction is carried out at 65° Centigrade and 143 psig for 5 hours while stirring at 450 rpm.

At the end of the reaction period, the reaction mixture is cooled down to room temperature, the pressure is released and then 300 ml. methanol containing 0.5 g. di-t-butyl-p-cresol is introduced. After stirring for 15 minutes, the reactor is opened up. The reaction mixture is filtered and the white pulverulent reaction product is dried in vacuo overnight at 50° Centigrade. The reaction product contains no scale resin. It weighs 300 g. indicating 60 percent yield. The chlorine analysis indicates 6.7 percent ethylene-propylene rubber content.

EXAMPLE 10 (COMPARATIVE EXAMPLE)

To 100 grams of the graft polymer prepared in Example 9 there are added 2 grams of a waxy processing agent sold under the trademark "Advawax 140", 2 grams of a tin stabilizer, sold under the trademark of "TM-181" by Cincinnati-Milacron and 1 gram of calcium stearate. The mixture is milled on a two-roll mill having rolls at a temperature of 400+ 5° Fahrenheit, and then compression molded at 360+5° Fahrenheit to give a 1/8 inch thickness sheet. The molded sheet has a white opaque appearance. Izod impact (notched) is measured following the procedure of ASTM D-256. The impact strength is 1.8 foot lbs. per inch.

EXAMPLE 11 (COMPARATIVE EXAMPLE)

Following the same procedure and using the same ingredients as in Example 10, 3.5 grams of an acrylic polymer sold under the trademark of "Acryloid K-120 ND" is added to the mixture prior to milling. The notched Izod impact strength of the molded sheet is 1.7 foot lbs. per inch. The sheet has a white opaque appearance.

EXAMPLE 12 (COMPARATIVE EXAMPLE)

Following the same procedure and using the same ingredients as in Example 10, 3.5 grams of a phenolic novolac is added to the polyvinyl chloride graft polymer prior to milling. The ⅛ inch molded sheet shows a notched Izod impact strength of 7 foot lbs. per inch. The sheet has a yellowish appearance.

EXAMPLE 13

Following the same procedure and using the same proportions as in Example 10, 3.5 grams of the oxyalkylated novolac prepared in Example 1 are added to the polyvinyl chloride graft polymer prior to milling. The compression molded ⅛ inch thick sheet shows a notched Izod impact strength of 7.5 foot lbs. per inch. The molded sheet has a white, opaque appearance.

The following Example illustrates that compositions of the invention having enhanced impact strength can also be obtained when using a non-grafted polyvinyl halide by employing a conventional acrylic impact strength modifying additive.

EXAMPLE 14

Example 4 is repeated using the same procedure and porportions of ingredients as in Example 2 except that, together with the oxyalkylated novolac resin, 10 grams of acrylic impact modifier Kane Ace B-12 (a proprietary methyl methacrylate-butadiene-styene polymer manufactured by Kanegafuchi Chem. Ltd. of Japan) are mixed with the polyvinyl chloride. The resultant mixture is compression molded substantially as described in Example 10 to provide a ⅛ inch thick sheet which has an excellent notched Izod impact strength substantially similar to that of the product of Example 13.

It is to be understood that the invention is not limited to the specific examples which have been offered merely as illustrative and that modifications can be made without departing from the spirit of the invention.

What is claimed is:

1. A polymer composition comprising a vinyl halide polymer and an oxyalkylated novolac resin of the formula:

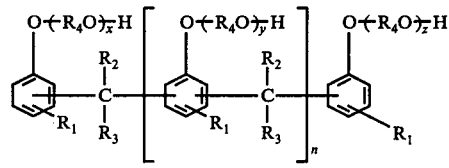

wherein $n$ has an average value of about 0.2 to 6, $x$, $y$ and $z$ are integers from 1 to 25, $R_1$ is independently selected from the group consisting of hydrogen, fluorine, chlorine, bromine, and a hydrocarbon radical;

$R_2$ and $R_3$ are independently selected from the group consisting of hydrogen, a hydrocarbon radical, and a halogen substituted hydrocarbon radical; and $R_4$ is a hydrocarbon radical.

2. The composition of claim 1 wherein $R_1$, $R_2$ and $R_3$ are hydrogen.

3. The composition of claim 1 wherein the $R_4$ radicals are ethylene and propylene radicals or mixtures thereof.

4. The composition of claim 1 wherein the vinyl halide is vinyl chloride.

5. The composition of claim 4 wherein the vinyl chloride polymer is a homopolymer.

6. The composition of claim 5 which includes in physical admixture a small, effective amount of an acrylic polymer impact strength modifying agent.

7. The composition of claim 6 wherein the acrylic impact strength modifier is a methyl methacrylate-butadiene-styrene polymer.

8. The composition of claim 1 wherein the vinyl halide polymer is a bulk-polymerized graft polymer of a vinyl halide and a polyolefin rubber.

9. The composition of claim 8 wherein the vinyl halide is vinyl chloride and the polyolefin rubber is selected from the group consisting of an ethylene propylene rubber and an ethylene propylene diene rubber.

10. The composition of claim 1 wherein said oxyalkylated novolac is present in the proportion of about 1 to about 30 parts by weight per 100 parts by weight of said vinyl halide polymer.

11. The composition of claim 8 wherein said oxyalkylated novolac has a molecular weight on the weight average basis of about 500 to about 20,000.

12. A molded article comprising the composition of claim 1.

13. A molded article comprising a polyvinyl chloride and an oxyalkylated novolac resin of the formula:

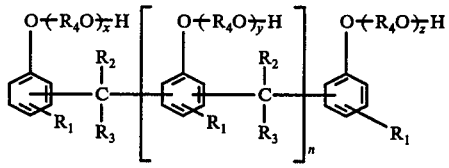

wherein said novolac has a molecular weight on the weight average basis of about 500 to about 20,000 and is present in the proportion of about 1 to about 10 parts by weight per 100 parts by weight of said polyvinyl chloride;

$R_1$, $R_2$ and $R_3$ are hydrogen;
$R_4$ are ethylene or propylene radicals or mixtures thereof;
$n$ has an average value of about 0.2 to 6; and
$x$, $y$ and $z$ are integers from 1 to 25.

* * * * *